July 6, 1937.  E. HUTCHENS  2,085,980
TRACTOR LUG
Filed April 25, 1936
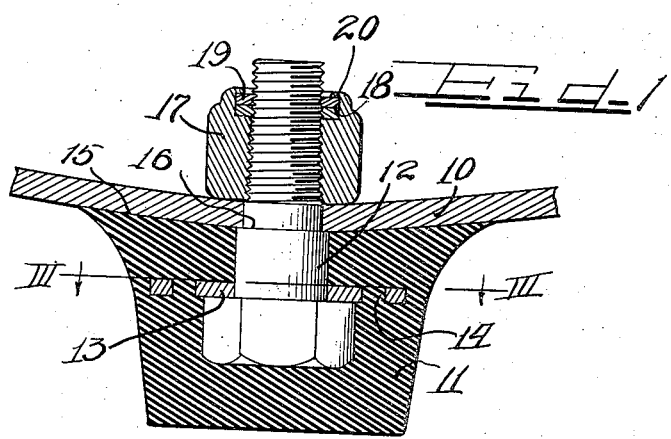
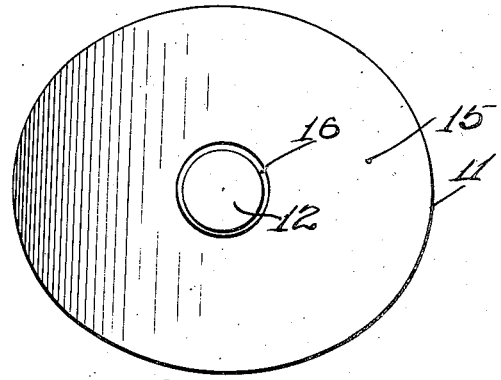
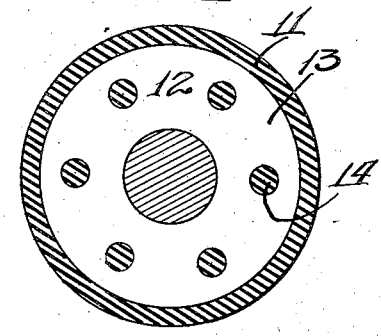
Inventor
Edward Hutchens Patented July 6, 1937

2,085,980

UNITED STATES PATENT OFFICE 2,085,980

TRACTOR LUG

Edward Hutchens, Milwaukee, Wis., assignor to Utility Manufacturing Company, Cudahy, Wis., a corporation of Wisconsin Application April 25, 1936, Serial No. 76,305

6 Claims. (Cl. 301—44)

The present invention relates in general to an improved ground gripping lug for the wheels of tractors principally but applicable also to the wheels of road machines, snow plows, and the like.

Metal lugs and bars have been prohibited by law on most all roads. Also, where tractors are used for industrial purposes as in manufacturing plants, metal lugs are manifestly unsuited.

It has therefore become the practice in most cases to equip the tractor with pneumatic tires, dual tires being about the limit in the larger sized tractors.

Pneumatic tires, while permitting the tractor to run on any kind of road without damaging effect, were nevertheless very unsatisfactory as punctures wer expensive and oftentimes dangerous, since a puncture in a large tire on a high tractor might upset it. Moreover, the tractive effort was materially decreased when pneumatic tires were used.

Having the foregoing in mind, the present invention seeks to provide a rubber lug that may be attached to any metal wheel rim. The lug is concaved to fit snugly against the surface of the rim. Such an arrangement is advantageous in that for road scrapers and the like the wheels may be made any practicable width in order to get the necessary road contact. Moreover, the lugs of the present invention are of much longer life and will outlast metal lugs for a similar purpose. Moreover, the rubber lugs of the present invention may be run over any road or factory floor without injury to the same.

A further object is to provide an improved tractor lug of simple construction, which is inexpensive to manufacture and which is efficient in operation.

A further object is to provide an improved tractor wheel lug of rubber material, which may be easily and readily attached and detached to the wheel rim by means of a single securing member.

Other objects and features of this invention will more fully appear from the following detailed description, taken in connection with the accompanying drawing, which illustrates a single embodiment thereof, and in which:

Figure 1 is a view showing the lug of the present invention attached to the rim of a wheel, a section being taken through the lug and rim in order to show the cooperative relationship of the associated parts;

Figure 2 is a view looking at the rim engaging face of the base of the lug; and

Figure 3 is a transverse sectional view showing the position of the securing parts for the lug, taken substantially on line III—III of Figure 1.

As shown on the drawing:

In Figure 1, the lug is shown as being mounted on a metal rim 10 of a tractor wheel or wheel of any other apparatus.

The lug is constructed of a block of rubber material 11 which is molded into substantially frusto-conical shape around the head of a securing bolt 12.

There is associated with the head of the bolt 12, a washer or plate 13 which is provided with a plurality of perforations or holes 14. This plate abuts the head of the bolt and when the rubber is molded around the head of the bolt, it is also molded around the plate 13 and the rubber extends through the openings in the plate, whereby the head is securely anchored in the rubber block.

The other end of the bolt, which is threaded, extends outwardly of the rim engaging surface of the base portion of the lug. This surface which is indicated at 15; it will be noted, is concaved so as to set securely against the outer surface of the wheel rim. Moreover, the base portion of the lug is outwardly flared and is of oval shape. The ground engaging end of the lug is substantially circular in form with a flat ground engaging surface.

The plate 13 forms an abutment member for the head of the bolt so that when the lug is attached to the rim of the wheel, the stresses tending to pull the head of the bolt out of the rubber will be distributed over a large area. The plate 13 is positioned in the rubber so that there is a substantial width of rubber between the plate and the rim engaging surface of the lug. It will also be noted that the axis of the securing bolt is so disposed that it is in axial alignment with the axis of the rubber block.

The bolt 12 at the rim engaging surface of the rubber block is contracted to form an annular shoulder 16 for engaging the surface of the rim. This surface cooperates with a lock nut 17 which is threaded onto the end of the bolt 12 to secure the lug to the wheel rim.

This lock nut may be of any desired construction. In the present case it is shown as comprising an ordinary nut which is provided at one end with a groove 18 for receiving therein one or more fibrous inserts 19. These inserts are secured in position by turning over the end portion of the nut as shown at 20. These washers or fiber inserts are initially provided with smooth central openings, the walls of which are cut by the threads on the bolt, when the nut is screwed into tight engagement with the wheel rim. These washer inserts will operate to secure the nut against loosening due to vibrations.

Each lug is individually secured to the rim of the tractor wheel and may readily be replaced should it become damaged, it being unnecessary to replace other than the lugs which are damaged. In practice, it is proposed to arrange the individual lugs in diagonal alignment across the face of the tractor wheel. The construction of the lugs is such that relatively close spacing of the lugs may be obtained circumferentially of the wheel. The lug is particularly advantageous in that it may be used with tractor wheels having rims of greater or less width to increase the tractive effort.

From the foregoing description, it will be apparent that the present invention provides an improved tractor lug which may be used on any kind of road without injuring it or may be used on factory floors; which is particularly adapted for use with wheel rims of varied width; a lug which may be easily and readily attached and detached to the wheel rim by means of a single securing member; and which is of simple construction, inexpensive to manufacture, and which is efficient in operation.

It is, of course, to be understood that although I have described in detail a single embodiment of my invention, the invention is not to be thus limited, but only insofar as defined by the scope and spirit of the appended claims.

I claim as my invention:

1. As an article of manufacture, a block of resilient material having a circular ground engaging portion, a flared elliptical portion defining a concaved face adapted to engage the tire surface of a tractor wheel, a bolt having its head anchored against movement in said block and a threaded end projecting outwardly of said concaved face, a washer on said bolt abutting said bolt head, said washer having a plurality of openings therethrough for receiving the resilient material, and a lock nut operatively associated with the threaded end of the bolt.

2. A detachable lug for tractor wheels and the like comprising a plate, a bolt extending through said plate, and a rubber pad vulcanized around said plate and the head of said bolt, said rubber grippingly engaging the head, plate and shank of the bolt adjacent said head.

3. A detachable lug for tractor wheels and the like comprising a plate, a bolt extending through said plate, and a rubber pad vulcanized around said plate and the head of said bolt, said plate having a plurality of apertures therein for receiving the rubber and said rubber grippingly engaging the head and shank of the bolt.

4. A detachable lug for tractor wheels and the like comprising a perforated plate, a bolt extending through said plate, and an enclosing block of rubber around the plate and head of the bolt, a substantial thickness of rubber being disposed between the plate and the base of the block and tightly engaging the shank of the bolt.

5. A detachable lug for tractor wheels and the like comprising a soft-rubber block, and a bolt having its head end anchored in said block and projecting outwardly relative to the wheel rim contacting surface of the block, said bolt having a contracted portion defining an abutment shoulder for engaging said rim.

6. A gripping lug arranged for removably securing to a wheel rim, said lug comprising a bolt having a polyhedral head, a perforated disc member abutting said head, said member being of larger diameter than said head, and a rubber pad vulcanized around said head and disc with the rubber extending through the perforations of the disc, the thickness of said pad below the disc being substantially the same as the thickness above the head, whereby the faces of the bolt head resist turning movement of the pad relative to the bolt and the bolt forms a rigid core for the pad.

EDWARD HUTCHENS.